(12) United States Patent
Legendre et al.

(10) Patent No.: US 10,998,710 B2
(45) Date of Patent: May 4, 2021

(54) HIGH-VOLTAGE DC CUT-OFF DEVICE

(71) Applicant: SUPERGRID INSTITUTE, Villeurbanne (FR)

(72) Inventors: Pierre Legendre, Villeurbanne (FR); Raphaël Chassagnoux, Villeurbanne (FR); Christophe Creusot, Pizay (FR); Philippe Guuinic, Paris (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 23 days.

(21) Appl. No.: 16/482,610

(22) PCT Filed: Jan. 15, 2018

(86) PCT No.: PCT/FR2018/050090
§ 371 (c)(1),
(2) Date: Jul. 31, 2019

(87) PCT Pub. No.: WO2018/142038
PCT Pub. Date: Aug. 9, 2018

(65) Prior Publication Data
US 2020/0006933 A1 Jan. 2, 2020

(30) Foreign Application Priority Data
Jan. 31, 2017 (FR) ...................... 1750792

(51) Int. Cl.
*H02H 3/087* (2006.01)
*H02H 3/02* (2006.01)
*H02H 3/20* (2006.01)

(52) U.S. Cl.
CPC ............ *H02H 3/025* (2013.01); *H02H 3/087* (2013.01); *H02H 3/202* (2013.01)

(58) Field of Classification Search
CPC ...... H01H 33/596; H02H 3/025; H02H 3/087; H02H 3/202; H02H 7/268
See application file for complete search history.

(56) References Cited

U.S. PATENT DOCUMENTS 3,777,178 A 12/1973 Gratzmuller
4,578,730 A 3/1986 Tokuyama et al.
(Continued)

FOREIGN PATENT DOCUMENTS

CN 103219699 A 7/2013
CN 103346541 A 10/2013
(Continued)

OTHER PUBLICATIONS

D. Xiang, B., Liu, Z., Geng, Y., & Yanabu, S. (2014). DC circuit breaker using superconductor for current limiting. IEEE transactions on applied superconductivity, 25(2), 1-7. (Year: 2014).*
(Continued)

*Primary Examiner* — Peter M Novak
(74) *Attorney, Agent, or Firm* — Workman Nydegger

(57) ABSTRACT

The invention proposes a high-voltage direct current cut-off device, comprising: in series, a cut-off device and a current limiter; an accumulation line in parallel with the current limiter, an oscillating circuit, in parallel with the cut-off apparatus, comprising an oscillation control switch and having an inductance wherein the accumulation line includes at least two accumulation capacitors, and in that the oscillation line extends from a branch connection point of the accumulation line situated between the two accumulation capacitors, determining a secondary segment of the accumulation line connected to the main conduction line between the current limiter and the main cut-off apparatus so as to form part of the oscillating circuit.

26 Claims, 5 Drawing Sheets

(56) References Cited

U.S. PATENT DOCUMENTS

| | | | |
|---|---|---|---|
| 4,618,905 A | | 10/1986 | Tokuyama et al. |
| 5,121,281 A | | 6/1992 | Pham et al. |
| 5,517,578 A | * | 5/1996 | Altman .................. G06K 9/72 |
| | | | 382/181 |
| 5,629,658 A | | 5/1997 | Chen |
| 9,640,973 B2 | | 5/2017 | Rong et al. |
| 2013/0070492 A1 | * | 3/2013 | Skarby ................. H02H 3/00 |
| | | | 363/51 |
| 2014/0217833 A1 | | 8/2014 | Rong et al. |
| 2015/0002977 A1 | | 1/2015 | Dupraz et al. |
| 2017/0271100 A1 | | 9/2017 | Ka et al. |
| 2017/0365998 A1 | | 12/2017 | Luscan et al. |
| 2018/0019583 A1 | * | 1/2018 | Dupraz ................. H02H 1/04 |

FOREIGN PATENT DOCUMENTS

| | | |
|---|---|---|
| CN | 103618298 A | 3/2014 |
| CN | 103779828 A | 5/2014 |
| EP | 0384346 A1 | 8/1990 |
| EP | 0431510 A1 | 6/1991 |
| FR | 2154929 A5 | 5/1973 |
| WO | 2016092182 A1 | 6/2016 |

OTHER PUBLICATIONS

Bonin et al., "A Method of Current Interruption in HVDC Networks by Means of AC Circuit-Breakers with Adapted ARC Characteristics and Energy Absorbers," International Conference on Large High Tension Electric Systems, Aug. 24-Sep. 2, 1970.

French Search Report from FR Application No. 1750792, dated Sep. 19, 2017.

International Search Report from PCT Application No. PCT/FR2018/050090, dated Apr. 3, 2018.

Office Action from corresponding CN Application No. 201880009604.9, dated Jan. 13, 2021.

* cited by examiner

HIGH-VOLTAGE DC CUT-OFF DEVICE

BACKGROUND

The invention relates to the field of transmission and/or high-voltage direct current distribution networks, generally designated with the acronym HVDC. The invention relates in particular to fault current cut-off devices intended for networks of this type.

HVDC networks are in particular considered as a solution to the interconnection of disparate or unsynchronized electricity production sites. HVDC networks are in particular considered for the transmission and the distribution of energy produced by offshore wind farms, rather than alternating current technologies, due to smaller line losses and the absence of the incidence of parasitic capacitances on the network over long distances. Networks of this type typically have voltage levels on the order of 50 kV and more.

In the present text for direct current, a device in which the nominal operating voltage is greater than 1500 V direct current is considered to be high-voltage. Such a high-voltage is, complementarily, also qualified as very high-voltage if it is greater than 75,000 V direct current.

For transmitting electricity from point to point, sectioning can be accomplished by means of an in-line end-to-end converter. On the other hand, sectioning can no longer be accomplished for a converter of this type in multipoint transmission. The cut-off of direct current in networks of this type is a crucial challenge directly conditioning the feasibility and the development of such networks.

Document EP-0.431.510 describes in particular a high-voltage direct current cut-off device.

Moreover, cut-off apparatus of the mechanical circuit breaker type are known for accomplishing current cut-off, i.e. the current cut-off is obtained solely by the opening of a mechanical switch element. A mechanical switch element of this type comprises two conductive parts making contact which are in electrical and mechanical contact when the switch element is closed, and which separate mechanically when the switch element is open. These mechanical circuit breakers have several disadvantages, in particular when large currents pass through them.

In the presence of a high current and/or voltage, mechanical cut-off can result in the establishment of an electrical arc between the two conductive parts, due to the considerable energy accumulated in the network that is protected by the apparatus. As long as the electrical arc remains established through the mechanical cut-off, the cut-off device is not accomplishing the electrical cut-off because a current continues to circulate through the apparatus due to the presence of the arc. The electrical cut-off, in the sense of an effective interruption of circulation of the electrical current, is sometimes particularly difficult to accomplish in a context of direct current and elevated voltage, these conditions tending to maintain the electrical arc. Moreover, this electrical arc degrades, on the one hand the two conductive parts making contact, by erosion, and on the other hand the surrounding medium, by ionization. Moreover, the current takes a certain time to be interrupted due to this ionization. This requires maintenance operations of the cut-off apparatus which are constraining and costly.

Fault currents in an HVDC network are particularly violent and destructive. When a fault generating a high current appears, it is necessary to cut it off rapidly, or possibly limit it while waiting for cut-off to be possible. Moreover, the cut-off of HVDC currents is more complex to accomplish than that of alternating currents (AC). In fact, during the cut-off of an alternating current, advantage is taken of the zero passage of the current to accomplish cut-off "Conventional" alternating current circuit breakers are therefore unsuitable for the cut-off of high-voltage direct currents, unless a passage through zero is generated via an adequate circuit surrounding the circuit breaker. Systems fulfilling this role of limitation and cut-off exist. Several solutions have been proposed for the cut-off of HVDC current: completely electronic, hybrid electronic/mechanical or mechanical cut-off apparatus, possibly assisted by passive components.

SUMMARY

As will be seen, the invention proposes a solution of this last type. It involves in fact associating a current limiter, which in the example illustrated is a passive component, with a cut-off apparatus, which is for example a mechanical circuit breaker, and with an oscillating circuit generating the zero passage of the current in this circuit breaker. The applicant's document WO-2016/092182 describes an HVDC cut-off device of this kind allowing ensuring protection of the network in a reduced time, and strongly limiting the conduction losses in the transmission line. This high-voltage direct current cut-off device comprises:

a first terminal 101 and a second terminal 102;
a main conduction line 141 which extends between the first and second terminals and which comprises, in series, a main current cut-off apparatus 121, having a first terminal and a second terminal, and a current limiter 111,
an accumulation line, connected at both its ends to the main conduction line, electrically in parallel with the current limiter and comprising at least one accumulation capacitor 131;
an oscillation line, in parallel with the main cut-off apparatus with respect to the main conduction line and comprising an oscillation control switch 123;

in which all or a portion of the main conduction line, of the accumulation line and of the oscillation line form, at the terminals of the main cut-off apparatus, an oscillating circuit when the oscillation control switch is brought to a closed state;
and in which the device has a first operating mode in which the main cut-off apparatus 121 is in a closed state and the oscillation control switch 123 is in an open state, and at least one second operating mode in which the main cut-off apparatus 121 is commanded to an open state and the oscillation control switch 123 is commanded to a closed state.

The device of document WO-2016/092182 operates satisfactorily. However, this device imposes strong constraints on the main circuit breaker after cut-off (in particular the transient recovery voltage: TRV), with a risk of restriking and therefore of failure of the cut-off. The other components also see strong current/voltage overshoots.

One problem subsisting in the setup of document WO-2016/092182 is that it necessitates, in the accumulation line and in the oscillation line, components designed to tolerate very high-voltages. Components of this type are expensive.

For the purpose of responding at least in part to this problem, the invention therefore proposes a high-voltage direct current cut-off device, comprising:

in series, a cut-off apparatus and a current limiter in a main conduction line;
an accumulation line in parallel with the current limiter, an oscillating circuit, in parallel with the cut-off apparatus comprising, in an oscillation line, an oscillation control switch and having an inductance, characterized in that the accumulation line comprises at least two accumulation capacitors, and in that the oscillation line extends from a branch connection point of the accumulation line situated between the two accumulation capacitors, determining a secondary segment of the accumulation line connected to the main conduction line between the current limiter and the main cut-off device so as to form part of the oscillating circuit.

In one embodiment, the high-voltage direct current cut-off device, comprises:
 a first terminal and a second terminal;
 a main conduction line which extends between the first and second terminals and which comprises, in series, a main current cut-off device, having a first terminal and a second terminal, and a current limiter configured to limit any current passing through of which the intensity exceeds a value called a threshold intensity to a value called limited intensity;
 an accumulation line connected at both its ends to the main conduction line, electrically in parallel with the current limiter and comprising at least one accumulation capacitor;
 an oscillation line, electrically in parallel with the main cut-off apparatus with respect to the main conduction line, comprising an oscillation control switch and having an inductance;
in which all or part of the main conduction line, of the accumulation line and of the oscillation line form, at the terminals of the main cut-off apparatus, an oscillating circuit when the oscillation control switch is brought to a closed state;
and in which the device has a first operating mode in which the main cut-off apparatus is in a closed state and the oscillation control switch is in an open state, and at least one second operating mode in which the main cut-off apparatus is commanded to an open state and the oscillation control switch is commanded to a closed state,
characterized in that
the accumulation line includes at least one first accumulation capacitor and one second accumulation capacitor, and in that the oscillation line extends from a branch connection point of the accumulation line situated between the two accumulation capacitors, determining a primary segment and a secondary segment of the accumulation line, the secondary segment being connected to the main conduction line between the current limiter and the main cut-off apparatus so as to form part of the oscillating circuit.

According to other optional features of a device according to the invention, taken alone or in combination,
 The device can include at least one surge arrestor connected to at least one of the first terminal and of the second terminal of the device, preferably a first surge arrestor connected to the first terminal and a second surge arrestor connected to the second terminal of the device.
 At least one of the accumulation capacitors in the accumulation line can be associated with a capacitor discharge device; preferably all the accumulation capacitors in the accumulation line are associated with a discharge device.
 The device can include, or be associated with, a current insulation member in the main conduction line.
 Said oscillation line can comprise a supplementary oscillation capacitor connected in series with said oscillation control switch.
 The oscillation capacitor in the oscillation line can be associated with a capacitor discharge device.
 The device can comprise, in series in the primary segment of the accumulation line, an additional resistance arranged between the first accumulation capacitor and the branch connection point where the oscillation line is connected electrically to the accumulation line.
 The device can include a charging circuit connected, in a controlled manner, the oscillation circuit to ground to cause the rapid charging of one or more capacitor(s) of the oscillating circuit.
 The charging circuit can include a charging control switch.
 The charging circuit can include a charging capacitor of which one plate is connected electrically to the oscillating circuit and of which the other plate is connected selectively, by means of the charging control switch, to ground.
 The charging circuit can include an electrical charging resistance.
 A resistance can be disposed in parallel with the current limiter, and be associated with one or more cut-off or commutation members allowing the circulation of the main conduction circuit current either through the current limiter or through the parallel resistance.
 Said current limiter can be of the superconducting resistor type.
 The oscillation line can comprise a coil connected in series with said oscillation control switch.
 The device can comprise an electronic circuit capable of commanding the main cut-off apparatus and the oscillation control switch to their open state or to their closed state.
 Said control circuit can be configured to detect excess intensity in the first operating mode and configured to generate an opening signal of the main cut-off apparatus 100 milliseconds at the latest after said excess intensity detection.
 Said control circuit in the second operating mode can be configured to generate an opening signal of the main cut-off apparatus and configured to generate a closure signal of the oscillation control switch after the generation of the opening signal of the main cut-off apparatus.
 A surge arrestor can be connected electrically in parallel to at least one accumulation capacitor.
 The device can be dimensioned for the application of a potential difference at least equal to 10 kV and of a nominal current at least equal to 500 A between the first and the second terminals of the device.
 The oscillation circuit can be dimensioned to create, in the oscillation circuit, an oscillation amplitude with an intensity at least equal to the threshold intensity and at least equal to the intensity limited by the current limiter.
 The resonance frequency of said formed oscillating circuit can be less than or equal to 10 kHz and/or the derivative of the current in the oscillating circuit with respect to time can be equal at most to 500 A/microsecond.
 The resonance frequency of said formed oscillating circuit can be greater than or equal to 500 Hz.
 C131 representing the equivalent electrical capacitance of the primary segment of the accumulation line, and C132 representing the equivalent electrical capacitance of the secondary segment of the accumulation line, the parameter Alpha=C132/(C131+C132) can be greater than or equal to 0.2, preferably greater than or equal to 0.4, more preferably greater than or equal to 0.5.

C131 representing the equivalent electrical capacitance of the primary segment of the accumulation line, and C132 representing the equivalent electrical capacitance of the secondary segment of the accumulation line, the parameter Alpha=C132/(C131+C132) can be less than or equal to 0.9, preferably less than or equal to 0.8.

C131 representing the equivalent electrical capacitance of the primary segment of the accumulation line, and C132 representing the equivalent electrical capacitance of the secondary segment of the accumulation line, the parameter Alpha=C132/(C131+C132) can be comprised in the range extending from 0.4 to 0.9, preferably in the range extending from 0.4 to 0.8, more preferably in the range extending from 0.5 to 0.8.

The device can include a "snubber" circuit connected electrically in parallel with the terminals of the main cut-off apparatus.

Various other features are revealed by the description given below with reference to the appended drawings which show, by way of non-limiting examples, embodiments of the object of the invention.

DETAILED DESCRIPTION OF VARIOUS EMBODIMENTS

The invention proposes a high-voltage direct current cut-off device.

Figure 1:
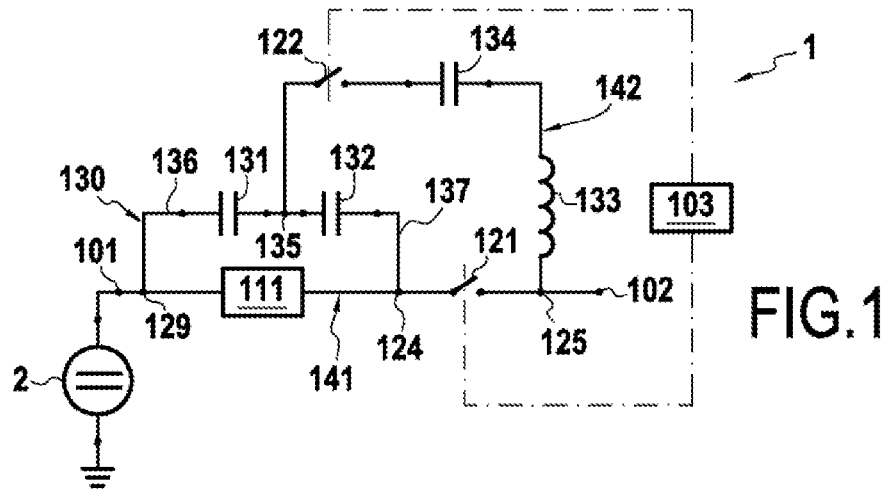
FIGS. 1 to 7 illustrate schematically different embodiments of a cut-off device conforming to the teachings of the invention.

FIG. 1 is a schematic representation of a first embodiment of a cut-off device 1 according to the invention. As can be seen in FIG. 1, the current cut-off device 1 includes a first terminal 101 and a second terminal 102. These terminals form inputs/outputs for the current in the device 1. Each of these terminals can correspond to physical terminal, for example a physical connection terminal, or a virtual terminal as being a point along a conductor.

The device 1 includes a main conduction line 141 which extends between the first terminal 101 and the second terminal 102 and which comprises, in series, a main cut-off apparatus 121, having a first terminal 124 and a second terminal 125, and a current limiter 111 configured to maintain the intensity of the current passing through it at a level less than or equal to a limited intensity.

The main cut-off apparatus 121 is advantageously an electromechanical apparatus, due to the low line losses which it is capable of generating. It can for example be a circuit breaker. The terminals 124, 125 of the main cut-off apparatus 121 form inputs/outputs for current in the main cut-off apparatus 121. Each of these terminals 124, 125 of the cut-off apparatus can correspond to a physical terminal, for example a physical connection terminal, or a virtual terminal as being a point along a conductor. In the example illustrated, the main conduction line 141 includes at least on electrical conductor, such as a cable and/or a metal bar, which extends between the two terminals 101, 102 of the device 1 and in which are inserted the main cut-off apparatus 121 and the current limiter 111.

The device 1 is intended to be integrated into an electrical installation. In the example illustrated, the first terminal 101 of the device 1 is connected to a high-voltage current source 2. The second terminal 102 is for example connected to a circuit consuming current, for example an electrical load or an electrical network. In this manner it can be considered that, in the example illustrated, the terminal 101 is an upstream terminal, or current input, while the second terminal 102 is a downstream terminal, or current output, in the current circulation direction. However, the device 1 according to the invention is reversible, so that current circulation through the device could be provided for in the opposite direction.

The main conduction line 141 is designed to have the nominal current provided by the direct voltage source 2 pass through it.

The current limiter 111 and the main cut-off apparatus 121 are connected electrically in series in the main conduction line 141 between the terminals 101 and 102 of the device 1.

The current limiter 111 is configured so that, for any current passing through it exceeding a threshold intensity, the limiter limits the current to a value called limited intensity. The values of threshold intensity and limited intensity can be equal. The limited intensity value can be greater than the threshold intensity which triggers the entry into action of the limiter. The value of the limited intensity can be less than the threshold intensity which triggers the entry into action of the limiter. The values of threshold intensity and of limited intensity are of the same order of magnitude, preferably at a maximum ratio of 1 to 3. During excess intensity, for example due to a short-circuit between the terminal 102 and ground, the value of current intensity passing through the current limiter 111 typically and transiently follows an increasing ramp, until a pea, and in particular crosses the threshold intensity which is an activation value of the limiter 111. The current then drop very rapidly to a limited intensity value defined by the dimensioning of the limiter 111. In order to avoid excessive heating of the limiter 111, the device 1 is configured to cut the current passing through this limiter 111 in a short time.

The current limiter 111 advantageously comprises a current limiter, preferably of the SCFCL (Superconducting Fault Current Limiter) superconductor type. In this case, it can comprise a superconducting resistor through which the current circulating in the main conduction line 141 passes. In known fashion, such a current limiter has a zero electrical resistance, or one that can be considered zero, as long as the intensity of the current passing through it is less than the activation value which constitutes the threshold intensity. Typically, this electrical resistance is zero in stable direct current, with the exception of the resistance, which can be considered to be zero, of the non-superconducting portions such as imperfections, joints and solder connections. Under these conditions, the potential difference at the terminals of the current limiter 111 is zero or can be considered to be zero. When the value of current intensity exceeds the activation value of the limiter, called here threshold intensity, the electrical resistance of the current limiter increases sharply, which tends to limit the intensity of the current which can pass through the current limiter and generates a voltage at the terminals of the current limiter 111.

A current limiter 111 of the SCFCL superconductor type comprises for example a cable or coil or other element made of superconductive material through which the nominal current between the terminals 101 and 102 passes. The element made of superconductive material is for example immersed in a liquid nitrogen bath so as to maintain it below its critical temperature as long as the intensity of the current passing through it is less than the activation value. The current limiter 111 can comprise an inductive component.

Another type of current limiter 111 can of course be considered, in particular a current limiter including IGBT and the structure of which is known per se, or even a resistive current limiter.

The device 1 also comprises an accumulation line 130, connected at both its ends to the main conduction line 141, electrically in parallel with the current limiter 111. The accumulation line 130 comprises at least one conductor, such as a cable or a metal bar, and at least two accumulation capacitors 131, 132, for example a first accumulation capacitor 131 and a second accumulation capacitor 132, which are arranged in series in the accumulation line 130. In the example illustrated, the accumulation line 130 includes a first end 129 which is connected electrically to the main conduction line 141 between the first terminal 101 and the current limiter 111. The second end of the accumulation line 130 is electrically connected to the main conduction line 141 between the current limiter 111 and the main cut-off apparatus 121. Particularly, as in the example illustrated, the second end of the accumulation line 130 can correspond to the first terminal 124 of the main cut-off apparatus 121.

The device 1 also includes an oscillation line 142, electrically in parallel with the main cut-off apparatus 121 with respect to the main conduction line 141, having an inductance and comprising an oscillation control switch 122.

The oscillation line 142 extends from a first end which is electrically connected to a branch connection point 135 of the accumulation line situated between the two accumulation capacitors 131, 132. The branch connection point 135 determines a primary segment 136 and a secondary segment 137 of the accumulation line 130. The secondary segment 137 is, as was shown above, connected to the main conduction line 141 between the current limiter 111 and the main cut-off apparatus 121 so as to form part of the oscillating circuit. The secondary segment 137 includes at least one accumulation capacitor, in the present case the second accumulation capacitor 132. One and/or the other of the two segments 136, 137 can comprise several capacitors. The electrical equivalent of the segment concerned is then considered, and the segment concerned can be seen as having a single equivalent capacitor having the equivalent capacity of the segment concerned.

The oscillation line 142 is electrically connected, by a second end, to the main conduction line 141 of the other side of the main cut-off apparatus 121 with respect to the connection of the secondary segment 137 with the main conduction line 141 so that the oscillation line 142, extended by the secondary segment 137 of the accumulation line 130, forms a line electrically parallel to the main cut-off apparatus 121 with respect to the main conduction line 141. In a manner particular to the example illustrated, the second end of the oscillation line 142 corresponds to the second terminal 125 of the main cut-off apparatus 121.

The inductance of the oscillation line 142 is formed either by a specific inductive component, for example a coil 133, or by the self-inductance of the electrical conductor of the oscillation line 142, which can comprise a cable and/or a metal bar, or several.

Thus, when the oscillation control switch 122 is brought to a closed state, or forms, at the terminals 124, 125 of the main cut-off apparatus 121, an oscillating circuit comprising at least one accumulation capacitor 132 and the inductance of the oscillation line 142. In the case illustrated, the oscillating circuit includes the oscillation line 142 and the secondary segment 137 of the accumulation line 130. However, depending on the precise disposition of the connecting points, the oscillating circuit can also comprise one or more segments of the main conduction line 141. In other words, the oscillating circuit is formed by all or part of the main conduction line 141, of the accumulation line 130 and of the oscillation line 140, and it is closed by the main cut-off apparatus 121.

An electrical current is able to circulate in a loop in the oscillating circuit when the oscillation control switch 122 is closed and the main cut-off apparatus 121 is in a closed electrical state in which it conducts the current between its terminals. The electrical current is an oscillating, i.e. alternating current, resulting from the discharge of the accumulation capacitor 132 through the inductance 133 of the oscillation line 142. As will be seen below, the oscillating circuit can include several capacitors. The presence of an inductance 133 in the form of a specific inductive component, particularly a coil, allows defining with accuracy the resonance frequency of the oscillation circuit formed during the closure of the oscillation control switch 122. In fact, the value of the inductance of this inductance 133 will then be preponderant with respect to the parasitic inductances in the oscillation circuit, for determining the resonance frequency of the oscillating circuit.

In the invention, the accumulation line 130 includes a first accumulation capacitor 131, situated in the primary segment 136, and a second accumulation capacitor 132 situated in the secondary segment 137. The two accumulation capacitors 131, 132, with non-zero electrical capacitance, for example comprised in the range extending from 0.1 to 10 microfarads for voltages on the order of 50 to 500 kV, are charged by the appearance of a potential difference at the terminals of the voltage limiter 111 when it limits the current passing through the device. The second accumulation capacitor 132, in the secondary segment 137, generates and participates in the current oscillations in the oscillating circuit when the oscillation control switch 122 is closed. The first accumulation capacitor 131 neither generates nor participates in the current oscillations, but carries a portion of the voltage during the cut-off attempt. Thus, the presence of the two accumulation capacitors, of which only one is integrated in series in the oscillating circuit when the oscillation control switch 122 is closed, allows reducing the dimensioning of the accumulation capacitors.

The oscillating circuit, and particularly its capacitors and its inductance, are electrically dimensioned so as to be able to generate an oscillating current having an oscillation amplitude of the current intensity, i.e. a maximum absolute value of the current intensity at least equal to the limited intensity maintained by the current limiter 111. Preferably, this condition is respected over several successive periods of oscillation.

Thus, the device 1 has a first operating mode, or nominal mode, in which the main cut-off apparatus 121 is in a closed state and the oscillation control switch 122 is in an open state. In this nominal operating mode, a nominal current can circulate through the cut-off device 1 in the main conduction line 141.

The device 1 also has at least one second operating mode, called the protection mode, in which the main cut-off apparatus 121 is commanded to an open state and the oscillation control switch 122 is commanded to a closed state.

To this end, the oscillation control switch 122 of the cut-off device is preferably a controlled, for example electrically controlled, switch, and the device 1 includes or is associated with an electronic control circuit 103 of the oscillation control switch 122 to control the latter between its electrically open and closed states.

In this case the main cut-off apparatus 121 is itself preferably controlled, for example electrically, by the electronic control circuit 103.

The electronic control circuit 103 can in particular include a microprocessor, random access memory, read-only memory, a communication buss and communication inputs/outputs. The electronic control circuit 103 can comprise or be connected to sensors, particularly current or voltage sensors measuring the voltage at different points of the device 1 or of the electrical installation in which the device is integrated. In a simple version, an electronic control circuit 103 of this type can include, for example, a measurement reducer designed to measure the voltage at the terminals of the current limiter 111, a comparator equipped with an internal clock and with a communication buss. The control circuit 103 can be dedicated to the device, or can form part of a control circuit controlling other elements of the installation.

The control circuit 103 is configured to apply control signals to the oscillation control switch 122 and, if necessary, to the main cut-off apparatus 121, for the purpose of obtaining selectively their respective opening/closing. The control circuit 103 is also preferably configured to detect excess intensity in the main conduction line 141. The circuit 103 can, to this end, receive a measurement of the current passing through the current limiter 111 (sent for example by a current probe) or receive a measurement of the potential difference at the terminals of the current limiter 111 or of one of the accumulation capacitors 131, 132 (sent for example by a voltmeter). The detection of excess intensity can be accomplished by the current limiter 111 itself. Thus, if crossing a current threshold or a potential difference is detected by the circuit 103, it can toggle from a first operating mode in which the device 1 must conduct a nominal current between the terminals 101 and 102, to a second operating mode in which the device 1 must cut off the current between the terminals 101 and 102. For example, the toggling can occur when the voltage measurement at the terminals of the current limiter 111 exceeds a certain threshold for a certain duration (for ex. more than 10,000 volts for more than one millisecond).

In the first operating mode, the circuit 103 holds the oscillation control switch 122 open to avoid conduction in the oscillation line 142, and holds the main cut-off apparatus 121 closed to guarantee conduction in the main conduction line 141 through the current limiter 111.

In the second operating mode, the circuit 103 generates an opening command of the main cut-off apparatus 121 and a closing command of the oscillation control switch 122. Preferably, the control circuit 103 detects beforehand the appearance of excess intensity during the crossing of the activation value of the current intensity, namely the threshold intensity, and generates the opening command of the main cut-off apparatus 121 only after a waiting period. The threshold intensity which corresponds to the activation of the intensity limiter 111 can for example be at least equal to 2 times, preferably at least equal to 4 times the nominal intensity of the nominal current, so as to limit the risks of untimely opening of the main cut-off apparatus 121.

Thus, during the appearance of excess intensity, the current limiter 111 holds the intensity of the current passing through it at a limited intensity and the potential difference at the terminals of the current limiter increases proportionately. The accumulation capacitors 131, 132, which are connected electrically in parallel with the current limiter 111, are then electrically charged. Upon closure of the oscillation control switch, the oscillating circuit formed forces the current passing through the main cut-off apparatus to pass through a zero value during the discharge of the accumulation capacitor 132 which was previously charged. With retention of the opening command on the main cut-off apparatus 121, the mechanical opening of the cut-off apparatus then easily becomes an electrical opening, with effective interruption of the current circulation when the current passing through it reaches zero value, a possible electrical arc being cut off and then no longer opposing the electrical cut-off. If, upon cutting off the electrical arc, the distance between contacts is sufficient, it is possible to completely cut off the passage of current. The dimensioning of this cut-off apparatus in terms of cut-off capacity can thus be reduced.

A current cut-off device of this type can for example be dimensioned for direct voltages at least equal to 10 kV, perhaps at least equal to 50 kV, typically at least equal to 320 kV, and potentially at least equal to 750 kV. A current cut-off device of this type can also be dimensioned for a nominal direct operating current at least equal to 1 kA, perhaps at least equal to 3 kA.

The waiting period between the detection of excess intensity and the generation of the opening command of the main cut-off apparatus 121 allows it possible to guarantee that the current limiter 111 has reached a phase of maintaining the current at its limited intensity. In this maintenance phase, the potential difference at the terminals of the current limiter 111 has allowed charging of the accumulation capacitors 131, 132. The waiting period between the detection of excess intensity and the generation of the opening command of the main cut-off apparatus 121 is for example at least equal to 5 milliseconds, perhaps at least equal to 10 milliseconds. In order to not maintain the current limiter 111 at its limited intensity for an excessive period of time, the waiting period between the detection of excess intensity and the generation of the opening command of the main cut-off apparatus 121 is for example equal to 50 milliseconds at most, perhaps equal to 20 milliseconds at most.

In the second operating mode, the control circuit 103 preferably generates the closing command of the oscillation control switch 122 after then generation of the opening command of the main cut-off apparatus 121. This time offset for the generation of the closure command of the oscillation control switch 122 allows guaranteeing that the formation of the oscillation circuit, inducing a passage to zero of the current through the main cut-off apparatus 121, is actually obtained when the opening command of the main cut-off apparatus 121 is applied and that the opening by separation of the contacts of the main cut-off apparatus 121 was in fact previously initiated.

This time offset also allows taking into account the offset between the application of the opening command on the main cut-off apparatus 121 and the effect of this command, for a main cut-off apparatus 121 of the mechanical type. This offset between the opening command of the main cut-off apparatus 121 and the closing command of the oscillation control switch 122 is for example at least equal to 500 microseconds, perhaps at least equal to 5 milliseconds. This offset is preferably less than 30 milliseconds. In order to limit to the maximum extent the operating time of the current limiter 111 in its state of limiting current to a limited intensity, and in order to limit the time of presence of an arc in the main cut-off apparatus 121 after the application of an opening command, this offset between the commands is advantageously equal to 20 milliseconds at most and preferably equal to 5 milliseconds at most.

The reduction of the operating time of the current limiter 111 in its current limiting state during the second operating mode can also facilitate a subsequent phase of toggling to the first operating mode, by closure of the main cut-off apparatus 121. A current limiter of the resistive type will require some time before being put back into service, which will be that much greater if it has been heated for a long time in its current limiting state.

It will be noted that there is no obligation to have an offset between the detection of excess intensity and the opening command on the main cut-off apparatus 121. On the other hand, it remains preferable to have a time interval between the detection of excess intensity and the closing command of the oscillation control switch 122, which gives the moment of the effective electrical cut-off and must therefore occur after a certain time, so that the capacitors are charged. This time interval is preferably comprised within the range extending from 500 microseconds to 30 milliseconds, depending on the necessary time offset between the opening command of the main cut-off apparatus 121 and the closing command of the oscillation control switch 122.

Figure 2:
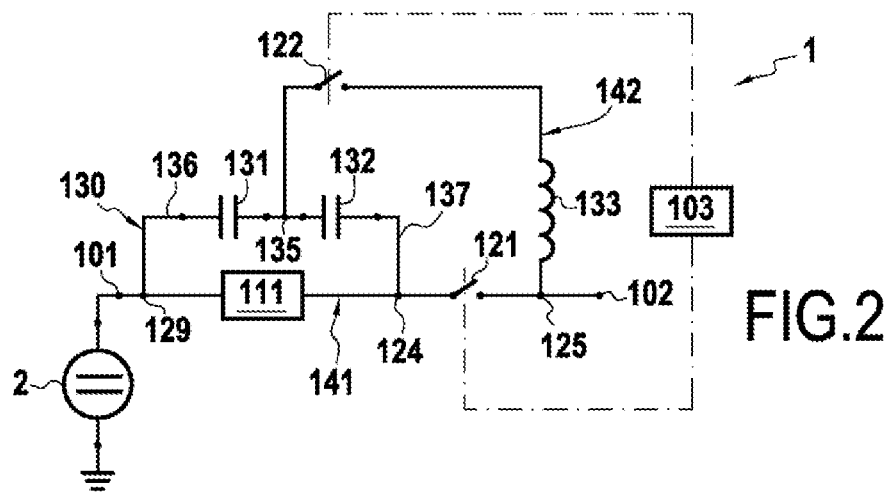

In the example illustrated in FIG. 1, the oscillation line comprises a supplementary capacitor 134. In the example illustrated, the oscillation control switch 122 is arranged between the branch connection point 135 and the supplementary capacitor 134 of the oscillation line. In this manner, as long as the oscillation control switch 122 is maintained in its open state, the supplementary capacitor 134 is disconnected electrically from the accumulation line 130 by the switch 122. In the example illustrated, the supplementary capacitor 134 of the oscillation line is arranged between the oscillation control switch 122 and the coil 133. However, an inverse arrangement could be considered. Moreover, the supplementary capacitor 134, which is situated in parallel electrically with the main cut-off apparatus 121, allows reinforcing the cut-off of the direct current in the oscillation line 142 when the electrical opening of the main cut-off apparatus 121 has been obtained. However, this supplementary capacitor 134 is not indispensable to the operation of the invention as is illustrated in the exemplary embodiment of FIG. 2 which illustrates a cut-off device 1 identical in every way to that which has just been described, except in that it does not comprise any capacitor in the oscillation line 142 between the branch connection point 135 and its connection point with the main conduction line 141.

The resonance frequency of the oscillating circuit formed is advantageously less than or equal to 10 kHz. Thus, with I the current passing through the main cut-off apparatus 121, the value dI/dt (for example less than or equal to 500 A/microsecond) is sufficiently reduced to facilitate the effective opening of the main cut-off apparatus 121 during retention of its opening command. Advantageously, the resonance frequency of the oscillating circuit formed is greater than or equal to 500 Hz to obtain rapid effective opening of the main cut-off apparatus 121 or to generate several passages to zero of the current passing through the main cut-off apparatus 121, if it is not immediately opened.

An example of dimensioning the oscillating circuit is detailed hereafter with reference to the embodiments of FIG. 1.

The determination of the characteristics of the accumulation capacitors 131, 132, of the possible capacitor 134, and of the inductance 133, with value L, can be accomplished in the following manner.

In the first place, the value Fr of the resonance frequency that is desired for the oscillation circuit is fixed, as well as the value Io of the minimal amplitude of an oscillation during closing of the oscillation control switch 122. Io must satisfy the condition Io>Inl, with Inl the intensity limited by the current limiter 111. Inl is for example equal to two times the nominal intensity of the nominal current of the cut-off device 1.

For the example of FIG. 1, the following equations are obtained:

$$Fr = \frac{1}{2\pi\sqrt{L*Ceq}}$$

$$Io = Vnl*\sqrt{Ceq/L}$$

$$\frac{1}{Ceq} = \frac{1}{C132} + \frac{1}{C134}$$

With:
Vnl: the potential difference between the terminals of the current limiter 111 when it maintains the current at its limited intensity value Inl,
Ceq: the equivalent capacitance of the capacitors 132 and 134 in series in the oscillation circuit formed,
C132 the capacitance of the capacitor 132,
C134 the capacitance of the capacitor 134, (In the absence of a supplementary capacitor 134, Ceq equals C132)
and L the inductance value of the inductance 133.

After an opening of the main cut-off apparatus 121, the control circuit 103 can then apply an opening command to the oscillation control switch 122. This opening command is for example accomplished after a sufficient time so that the main cut-off apparatus 121 has been able to open electrically and the current passing through the output terminal 102 is zero. This opening command can for example be offset by a duration at least equal to 5 milliseconds with respect to the closing command of the same oscillation control switch 122, this offset being for example 25 milliseconds. The opening of the oscillation control switch 122 will allow renewed formation of the oscillating circuit after a renewal of conduction of the cut-off device 1.

Figure 3:
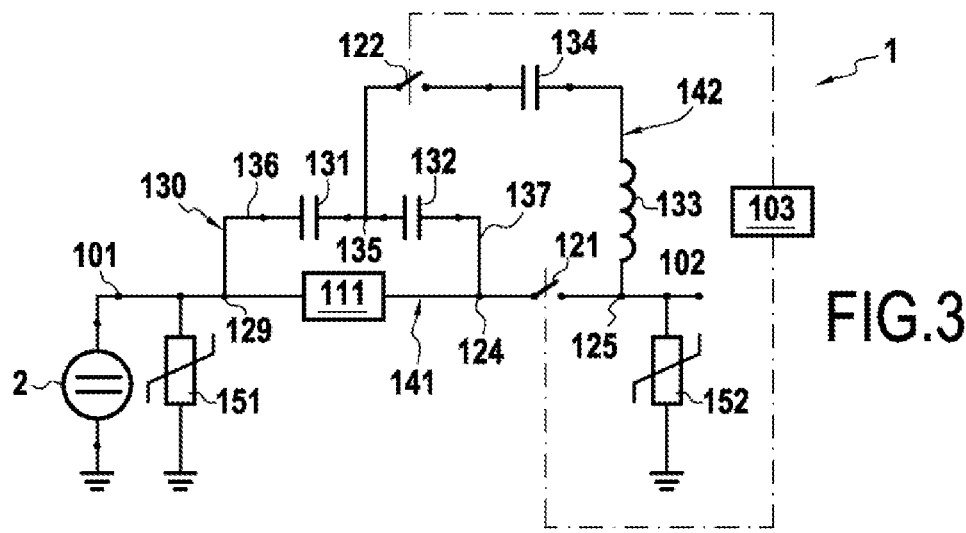

FIG. 3 illustrates a third example of a cut-off device 1 according to the invention. In this embodiment, provision has been made to connect, to each of the terminals 101, 102 of the device 1, a surge arrestor 151, 152 connected electrically between the terminal 101, 102 concerned and ground. The structure of the other components of the cut-off device 1 of FIG. 3 is otherwise identical to that of the cut-off device of FIG. 1. The same variant can be applied to a cut-off device like that illustrated in FIG. 2.

Most excess intensities are transient and are not connected to a permanent short circuit. Consequently, the cut-off device 1 is advantageously configured to implement of the cycle of the OCO (open-closed-open) type, the opening of the main cut-off apparatus 121 in the second operating mode being followed by a discharge of the accumulation capacitor 132 and with an attempt to close this main cut-off apparatus 121 to determine whether the fault is persistent, then a new opening of this main cut-off apparatus 121 if it has been determined that the fault is in fact persistent.

Figure 4:
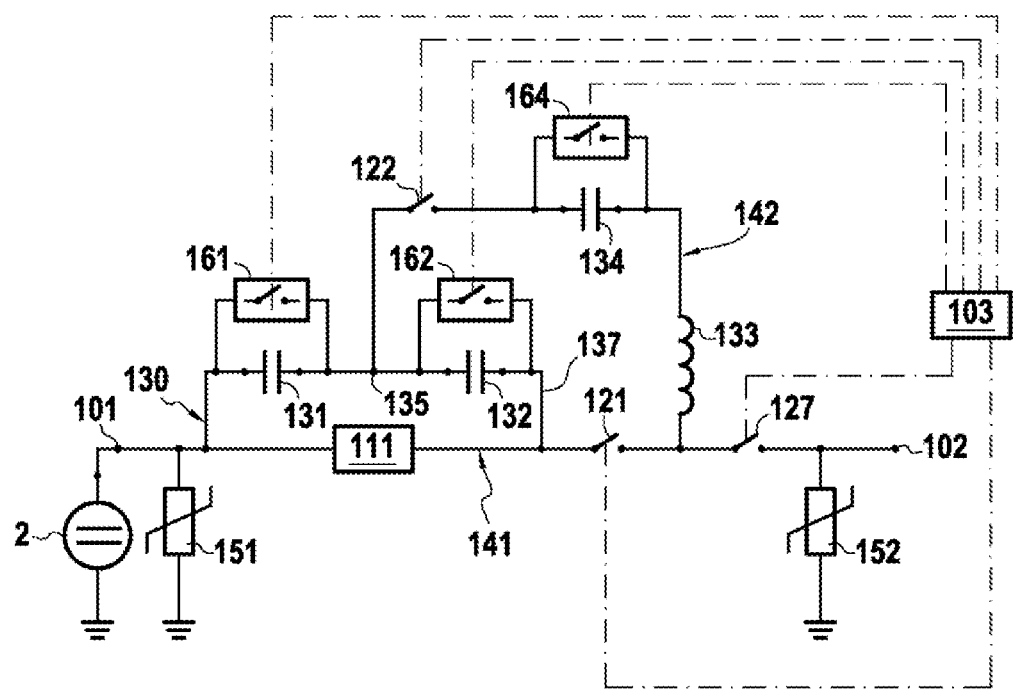

Illustrated in FIG. 4 is a fourth embodiment in which discharge system 161, 162, 164 for the capacitors of the cut-off device 1 have been provided for. The illustrated example is derived from the first exemplary embodiment illustrated in FIG. 1, but the same principle could be used for the other exemplary embodiments described above or below.

In the example illustrated, each of the accumulation capacitors 131, 132, and also in the present case the supplementary capacitor 134 of the oscillation line 142, are each equipped with a discharge system dedicated to the capacitor concerned. As a variant, however, it could be provided that a single or more of the set of capacitors could be provided with a discharge system. Likewise, it could be provided that several capacitors, or all the capacitors of the cut-off device 1 are provided with a common discharge system.

A capacitor discharge system 161, 162, 164 is a system which allows nullifying the potential difference between the two plates of the capacitor concerned. This can for example be a controlled electrical circuit which, in one discharge configuration, interconnects the two plates of the capacitor concerned. Very simply, it can be an electrical discharge circuit connecting the two plates of the capacitor concerned, this electrical discharge circuit including a discharge control switch which, in an open state, defines an inactive configuration of the discharge system, allowing the charging of the capacitor concerned and which, in a closed state, defines the discharge configuration of the discharge system, ensuring the discharge of the capacitor through the discharge circuit. The discharge circuit can possible include resistive components. Preferably, each discharge system, for example the discharge control switch, is controlled by the electronic control circuit 103 of the cut-off device 1. The discharge system allows the resetting to zero of the cut-off device between two cut-off operations by the cut-off device 1. The presence of one or more capacitor discharge systems of the cut-off device 1 is preferably associated with the presence of an isolating member 127, preferably of the sectioning type, in the main conduction line 141. In the embodiment illustrated in FIG. 4, an isolating member 127 of this type is arranged downstream of the current limiter 111, of the main cut-off apparatus 121 and of the connection point of the second end of the oscillation line 142 with the main conduction line 141. The insulation member 127 can be integrated into the cut-off device 1, as in the embodiment of FIG. 4. It can also be arranged downstream of it, preferably directly connected to the downstream terminal 102 of the cut-off device 1. The isolating member 127 is preferably controlled between an open state and a closed state by the electronic control unit 103 of the cut-off device 1.

In a device like that illustrated in FIG. 4, the resetting to zero of the capacitors is carried out as follows. When a first opening of the main cut-off apparatus 121 has been carried out as described above, the isolating member 127 is commanded into its open state to prevent any circulation of the nominal current in the main conduction line, even after closure of the main cut-off apparatus 121. When the isolating member 127 is open, the accumulation capacitors 131, 132, and a possible supplementary capacitor 134 in the oscillation line 142, are electrically isolated from any circuit situated downstream of the isolating member 127. It is then possible to reset to zero the capacitors equipped with a discharge system 161, 162, 164. Once the capacitors are discharged, it possible to open the oscillation control switch 122 then re-close the main cut-off apparatus 121. The sequence ends with the closing of the isolating member 127 which then reestablishes the current circulation in the main conduction line 141. In this manner, in case of the presence of a fault, the cut-off device 1 is immediately operation in a known state.

Figure 5A:
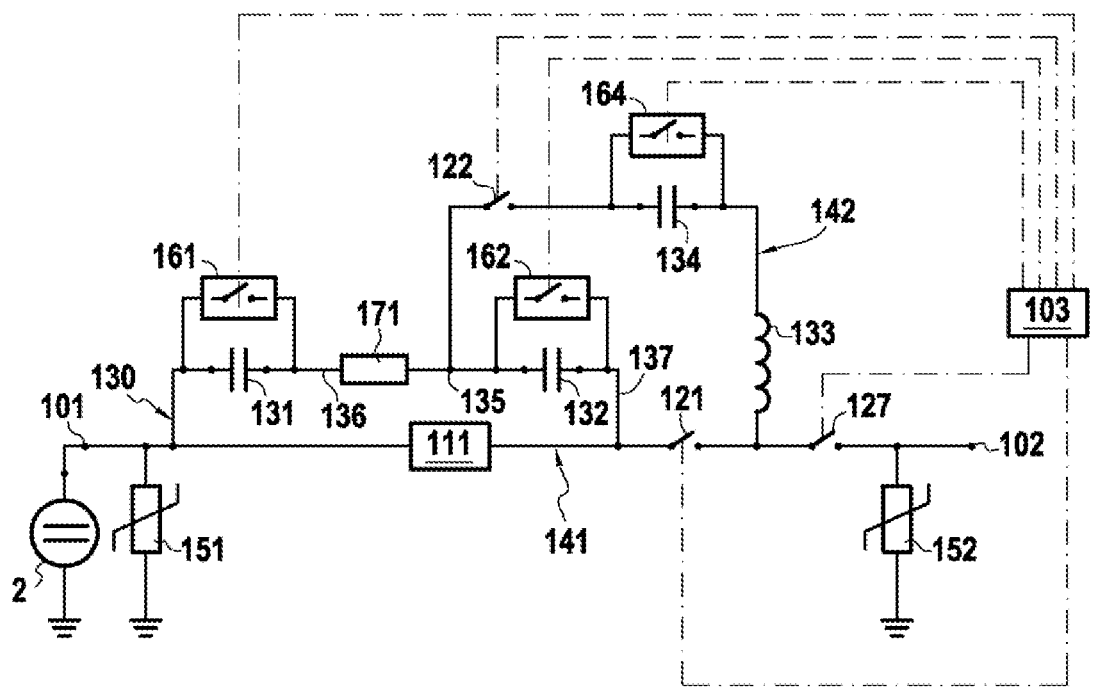

Illustrated in FIG. 5A is a fifth exemplary embodiment of the invention in which has been provided, in series with the primary segment 136 of the accumulation line 130, an additional resistance 171 arranged between the first accumulation capacitor 131 and the branch connection point 135 where the oscillation line 142 is connected electrically to the accumulation line 130. This additional resistance 171 allows avoiding or strongly limiting the interaction of the first accumulation capacitor 131 with the oscillating circuit when it is discharged in the second operating mode of the cut-off device. The example illustrated is derived from the fourth exemplary embodiment illustrated in FIG. 4, but the same principle could be used for the other exemplary embodiments described above or below.

Figure 5B:
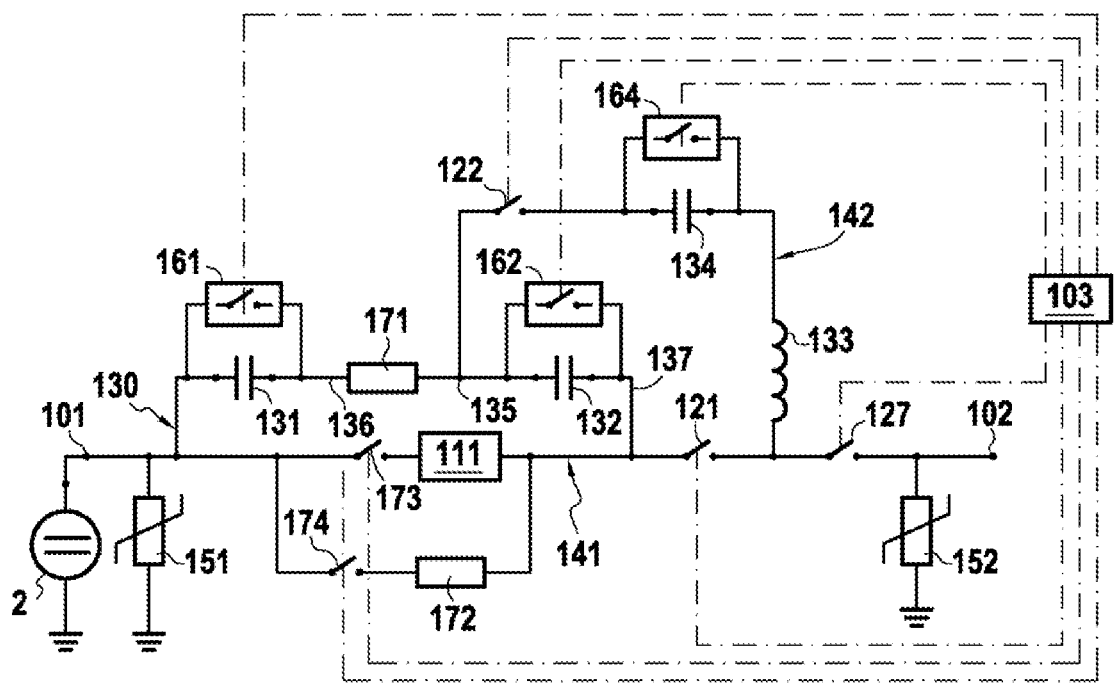

Illustrated in FIG. 5B is a variant of the fifth exemplary embodiment of the invention in which has been provided a resistance 172 in parallel with the current limiter 111, preferably in combination with the cut-off or commutation member, for example disconnectors 173, 174 allowing orienting the circulation of the current either in the current limiter 111, or in the parallel resistance 172. This embodiment allows making the current pass through this resistance during the recovery time of the limiter after a transition. The example illustrated in derived from the fifth exemplary embodiment illustrated in FIG. 5A, but the same principle could be used for the other exemplary embodiments described above or below.

Although not shown in the figures, it is possible to provide that one of the capacitors, several capacitors or all the capacitors of the device is (are) equipped with a surge arrestor electrically in parallel with the capacitor concerned. Such a surge arrestor allows limiting the amplitude of the potential difference at the terminals of the capacitor concerned and allows absorbing the inductive energy stored in the installation. Likewise, it is possible to provide for a surge arrestor electrically in parallel with the coil 133.

Figure 5C:
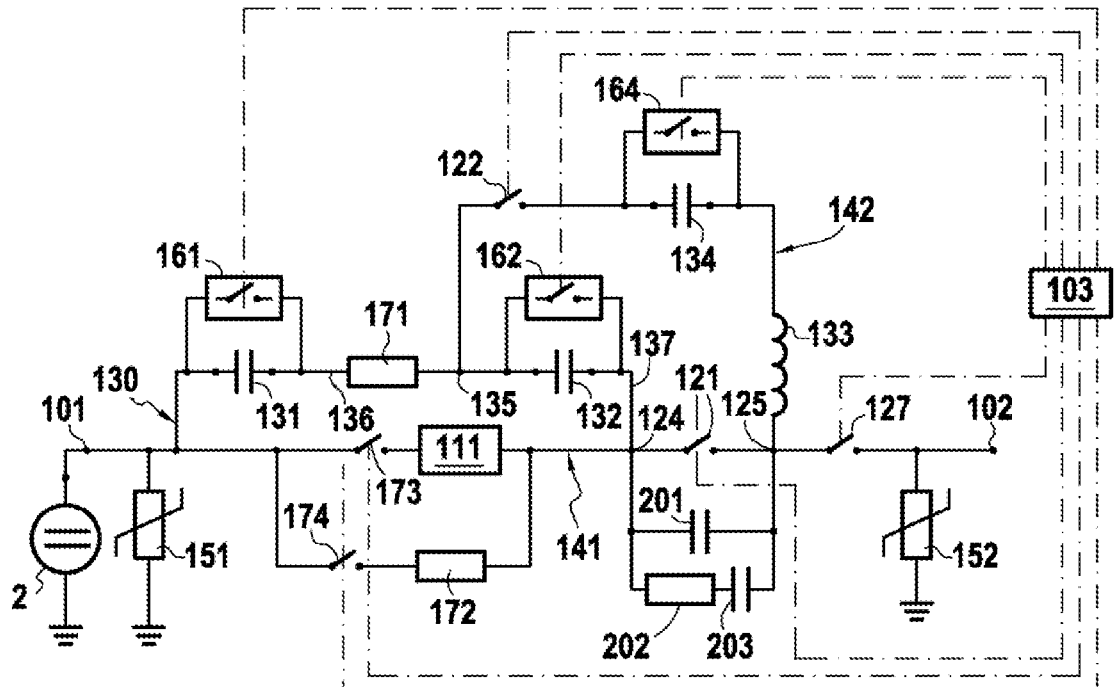

Likewise, in the different embodiments, it is possible to consider, for the same reason, disposing, electrically in parallel with the terminals of the main cut-off apparatus 121, a surge arrestor or a so-called "snubber" circuit including a capacitor and a resistor in series. This specific case is illustrated by way of an example in FIG. 5C. In this example, the so-called "snubber" circuit comprises, in parallel with the main cut-off apparatus 121, a capacitor 201, itself in parallel with at least one circuit including in series a resistor 202 and a capacitor 203. The values of the components are adapted to obtain a "snubber" circuit impedance as a function of the frequency which reduces the transient recovery voltage (called TRV) at the terminals of the main cut-off apparatus 121, in order to further limit the risk of a restriking of the main cut-off apparatus 121.

In the exemplary embodiments described above, a particularly rapid and reliable cut-off is obtained in the case of a clear fault in which a sharp increase occurs in the intensity of the current circulating in the main conduction line 141. In this type of fault, a fault current escapes, for example to ground, through a fault having a zero or small electrical impedance. In fact, this sharp increase is manifested by the very rapid appearance of a potential difference at the terminals of the current limiter 111, which allows rapid charging of the accumulation capacitors 131 132, and therefore allows rapidly triggering the discharge of the accumulation capacitor 132 in the oscillating circuit for cutting off the current through the main cut-off apparatus 121.

On the other hand, the circuits above, taken in isolation, have poorer performance in the case of the electrical fault generally called an impedance-dependent fault. In this type of fault, a fault current escapes, to ground for example, through a fault having a non-negligible electrical impedance. During the appearance of faults of this type, the increase in intensity in the conduction line can be slower, so that a delay occurs before the appearance of a sufficient potential difference at the terminals of the current limiter 111 to cause charging of the accumulation capacitors 131, 132. It follows that a certain time is required to be able to possibly trigger discharge in the oscillating circuit. In certain cases, when the intensity in the main conduction line 141 remains less than the threshold intensity, the necessary charging of the accumulation capacitors is not obtained. Likewise, the circuits described above do not allow the oscillating circuit to operate in the case of a voluntary cut-off by opening the main cut-off apparatus 121 in the absence of a fault. In fact, under such an assumption, the intensity of the current in the main conduction line is less than or equal to the nominal intensity, so that the current limiter is not put into action and does not generate a potential difference for charging the accumulation capacitors 131, 132.

Figure 6:
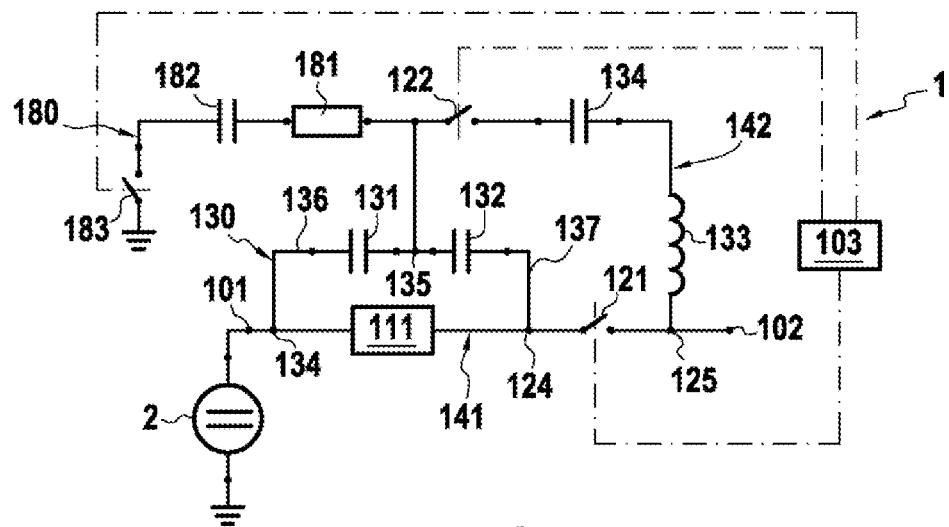
Figure 7:
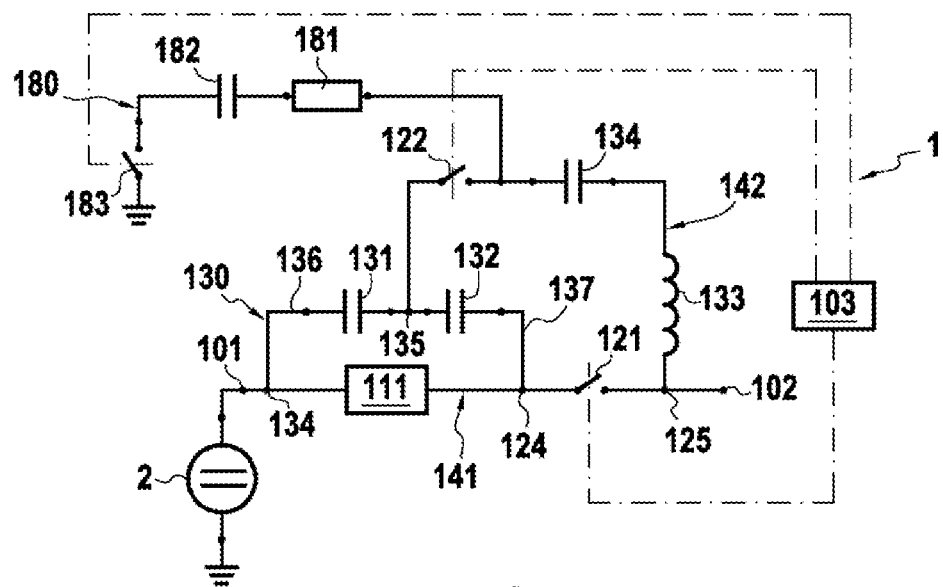

Thus, the sixth mode and the seventh embodiments of a device according to the invention, illustrated respectively in FIGS. 6 and 7, comprise a charging circuit 180 allowing at least one capacitor of the oscillating accumulation circuit 131, 132, to be charged, even in the absence of a potential difference at the terminals of the current limiter 111. The examples illustrated in FIGS. 6 and 7 are based on the first exemplary embodiment of the cut-off device illustrated in FIG. 1, but the addition of a charging circuit 180 can of course be accomplished for all the other exemplary embodiments described above.

Preferably, the charging circuit 180 is a controlled charging circuit, controlled for example by the electronic control unit 103 of the cut-off device 1. To this end, the charging circuit 180 preferably has a charging control switch 183, which is preferably controlled electrically by the electronic control unit 103.

The charging circuit 180 allows connecting, in a controlled manner, the oscillation circuit to ground to cause the rapid charging of one or more of the capacitors present in the oscillating circuit. To that end, the charging circuit 180 can use an electrical potential present in the oscillating circuit during the nominal operation of the installation, i.e. when the cut-off device 1 is in its first operating mode.

In the examples illustrated, the charging circuit 180 includes a charging capacitor 182 of which one plate is connected electrically to the oscillation circuit and of which the other plate is connected selectively, through the charging control switch 183, to ground.

In the exemplary embodiment of FIG. 6, the charging capacitor 182 is thus permanently connected electrically to the branch connection point 135 situated between the two accumulation capacitors 131, 132 of the accumulation line 130. It is understood that when the charging control switch 183 is closed, an electrical potential appears at the branch connection point which allows the accumulation capacitors 131, 132 to be charged. The oscillation control switch 122 is not arranged between the charging circuit 180 and the branch connection point 135. This embodiment operates in the same manner in a cut-off device 1 such as that illustrated in FIG. 2, without the supplementary capacitor 134 in the oscillation line 142.

In the exemplary embodiment of FIG. 7, the charging capacitor 182 is permanently connected electrically to the oscillation line 142 at a point which is separated from the branch connection point 135 by the oscillation control switch 122. In this embodiment, it is understood that, when the charging control switch 183 is closed, the charging of the supplementary capacitor 134 is triggered which, in the oscillating circuit, at the time of the closing of the oscillation control switch 122, plays the role of an accumulation capacitor which discharges into the oscillating circuit.

In both cases, an electrical charging resistance 181 is advantageously provided for in the charging circuit. Preferably, the electrical charging resistance 181 is arranged in series between the charging capacitor 182 and the oscillating circuit. The charging resistance allows limiting the inrush current during the activation of the charging circuit which corresponds to the closing of the charging control switch 183. It also allows avoiding the charging circuit interfering too much during the oscillation process, which leads to the cut-off of current by the main cut-off apparatus 121. Likewise, a transformer could be provided for in the charging circuit to reduce voltage and thus slow down charging.

Figure 9:
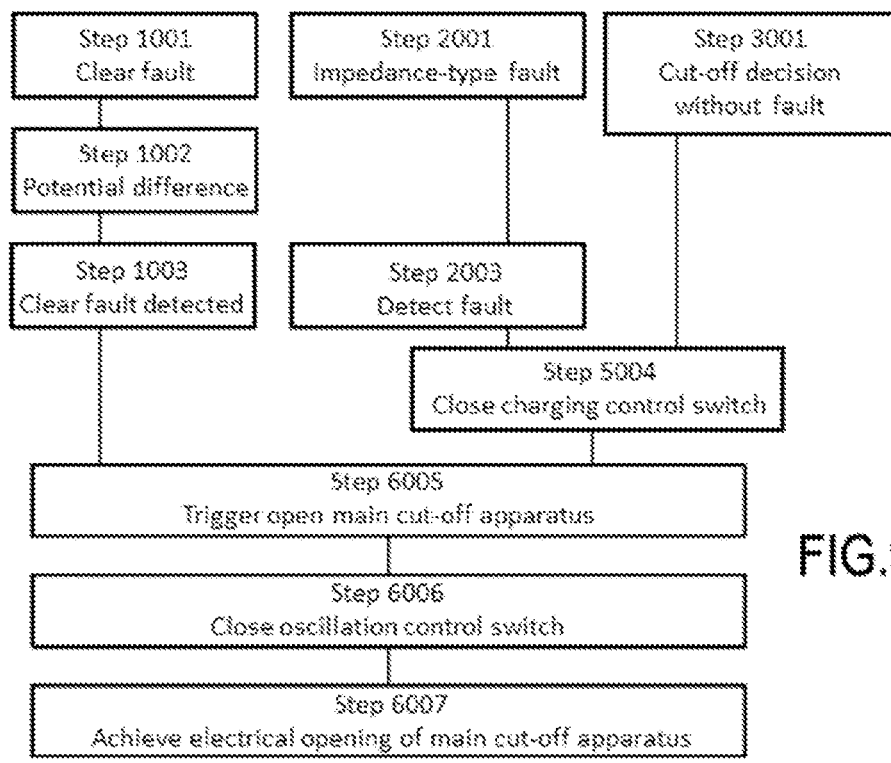
FIG. 9 illustrates the progress of an opening sequence of a cut-off device according to the invention.

Illustrated in FIG. 9 is the progress of an opening sequence of a cut-off device 1 according to the invention.

The first branch of the sequence is common to all the embodiments of the invention described above. This first branch begins with step 1001 with the appearance of a clear fault in the electrical installation. This clear fault causes the appearance, in step 1002, of a potential difference at the terminals of the current limiter 111, which allows charging of the accumulation capacitors 131, 132. In step 1003, the clear type fault is detected, for example by detecting the appearance of this potential difference at the terminals of the current limiter 111.

From there, the mechanical opening of the main cut-off apparatus 121, as described above, can be triggered in step 6005, then, in step 6006, the closing of the oscillation control switch 122, which allows achieving, in step 6007 the effective electrical opening of the main cut-off apparatus 121, by the disappearance of any electrical arc in the apparatus 121 which is in its open state.

The second and third branches of the sequence are specific to the embodiments of the invention which comprise a charging circuit 180 as describe with reference to FIGS. 6 and 7.

The second branch of the sequence starts in step 2001 with the appearance of a fault of the impedance-dependent type in the electrical installation. This impedance-dependent fault is detected in step 2003 in a manner known per se, for example by measuring the intensity circulating in the main conduction line 141. In step 5004, the closing of the charging control switch 183 is triggered so as to cause charging of a capacitor. Then, preferably after a sufficient charging delay starting from the closing of the charging control switch 183, the opening of the main cut-off apparatus 121 is triggered, as in the context of the first branch of the sequence, in step 6005. The sequence is continued by steps 6006 and 6007 described for the first branch of the sequence.

The third branch of the sequence corresponds to a programmed cut-off decision, at step 3001, in the absence of any electrical fault. In this case, the opening sequence starts in step 5004 of closing of the charging control switch 183, and continues with steps 6005, 6006 and 6007 in the same order as described with reference to the second branch.

Within the scope of the embodiments comprising a charging circuit 180, it is possible to advantageously provide for adding a contactor at the terminals of the current limiter 111 to short-circuit the limiter in the event of a programmed cut-off with no fault present or in the case of the detection of a fault of the impedance-dependent type. This allows avoiding a transition of the current limiter 111 which could occur following the appearance of transient currents and voltage during cut-off. The contactor would be closed just prior to step 5004 of triggering the closing of the charging control switch 183.

The embodiments comprising a charging circuit 180 have the advantage of allowing an effective cut-off of the circulation of current in the main conduction line 141 regardless of the fault considered, including the absence of a fault, within controlled delays, while still optimizing the dimensioning of the of the components of the cut-off device 1.

In the different embodiments illustrated, it is possible to consider connecting an additional current limiter (not illustrated) in series between the terminals 101 and 102. An additional current limiter of this type can be of the resistive type and will allow modifying the dimensioning of the different switches of the current cut-off device 1.

Figure 8:
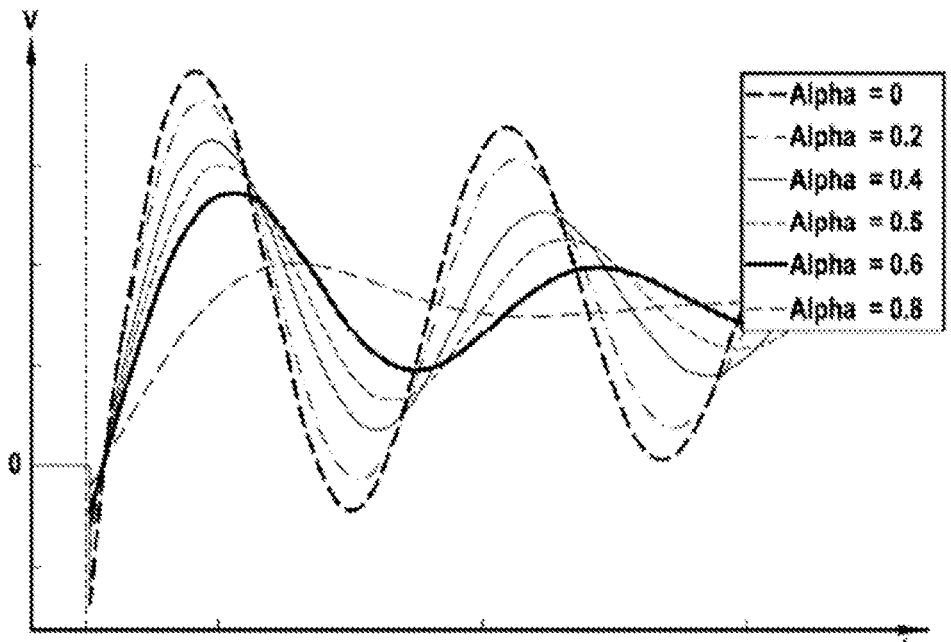
FIG. 8 illustrates different voltage variation curves at the terminals of the main cut-off apparatus, for different values of the parameter Alpha reflecting the proportion of each electrical capacitance in the capacitor bridge.

To illustrate the advantages of the invention with respect to the device described in WO-2016/092182, a parameter Alpha=C132/(C131+C132) is introduced which reflects the proportion of each electrical capacitance in the capacitor bridge formed by the accumulation capacitors 131 and 132. If one of the two segments 136, 137 includes several capacitors, the equivalent electrical capacitance is considered. In other words, C131 represents the equivalent electrical capacitance of the primary segment of the accumulation line, and C132 represents the equivalent electrical capacitance of the secondary segment of the accumulation line 130. This parameter can assume various values between 0 and 1 depending on the values of the electrical capacitances C131 et C132. FIG. 8 presents different curves illustrating the relative variations of voltage (transient recovery voltage—TRV) at the terminals of the main cut-off apparatus 121, after the effective electrical cut-off, for the assembly of FIG. 2, each for a different value of the parameter Alpha.

In this FIG. 8, is seen the very great influence of the parameter Alpha on the transient recovery voltage (TRV) at the terminals of the main cut-off apparatus 121. These curves tend to show that a measurable favorable effect on the transient recovery voltage (TRV) is obtained with accumulation capacitors 131, 132 the electrical capacitance values of which allow obtaining a value of the parameter Alpha greater than or equal to 0.2. However, these curves tend to show that it is advantageous to select accumulation capacitors 131, 132 the electrical capacitance values of which allow obtaining a value of the parameter Alpha greater than 0.4, preferably greater than 0.5.

However, it was also noticed that to contain the costs of the components in the cut-off device 1 to values that are economically acceptable, it was desirable to select accumulation capacitors 131, 132 of which the electrical capacitance values allow obtaining a value of the parameter Alpha less than or equal to 0.9, preferably less than or equal to 0.8.

In this manner, it appears that it is desirable to select accumulation capacitors 131, 132 the electrical capacitance value of which allow obtaining a value of the parameter Alpha in the range extending from 0.4 to 0.9, preferably in the range extending from 0.4 to 0.8, more preferably in the range extending from 0.5 to 0.8.

The invention is not limited to the examples described and shown, because various modifications can be made to it without departing from its scope.

The invention claimed is:

1. A high-voltage direct current cut-off device, comprising:
    a first terminal and a second terminal;
    a main conduction line which extends between the first terminal and the second terminal and which comprises, in series, a main current cut-off apparatus, having a first cut-off terminal and a second cut-off terminal, and a current limiter configured to limit any current passing through the current limiter having an intensity that exceeds a first value called a threshold intensity to a second value called a limited intensity;
    an accumulation line having a first end and a second end, each of the first end and second end of the accumulation line being connected to the main conduction line such that the accumulation line is electrically in parallel with the current limiter;
    an oscillation line, electrically in parallel with the main cut-off apparatus with respect to the main conduction line, the oscillation line comprising an oscillation control switch and the oscillation line having an inductance;
    wherein all or part of the main conduction line, of the accumulation line, and of the oscillation line form, at the first cut-off terminal and the second cut-off terminal of the main cut-off apparatus, an oscillating circuit when the oscillation control switch is brought to a closed state; and
    wherein the high-voltage direct current cut-off device has a first operating mode in which the main cut-off apparatus is in a closed state and the oscillation control switch is in an open state, and at least one second operating mode wherein the main cut-off apparatus is commanded to an open state and the oscillation control switch is commanded to a closed state,
    wherein the accumulation line includes at least a first accumulation capacitor and a second accumulation capacitor, and
    wherein the oscillation line extends from a branch connection point of the accumulation line situated between the first accumulation capacitor and the second accumulation capacitor such that the branch connection determines a primary segment and a secondary segment of the accumulation line, the secondary segment being connected to the main conduction line between the current limiter and the main cut-off apparatus so as to form part of the oscillation circuit.

2. The high-voltage direct current cut-off device according to claim 1, further comprising at least one surge arrestor connected to at least one of the first terminal and of the second terminal of the high-voltage direct current cut-off device.

3. The high-voltage direct current cut-off device according to claim 1, wherein at least one of the accumulation capacitors in the accumulation line is associated with a capacitor discharge device.

4. The high-voltage direct current cut-off device according to claim 1, further comprising, or associated with, a current isolating member in the main conduction line.

5. The high-voltage direct current cut-off device according to claim 1, wherein the oscillation line comprises a supplementary oscillation capacitor connected in series with the oscillation control switch.

6. The high-voltage direct current cut-off device according to claim 5, wherein the oscillation capacitor in the oscillation line is associated with a capacitor discharge device.

7. The high-voltage direct current cut-off device according to claim 1, further comprising, in series in the primary segment of the accumulation line, an additional resistance arranged between the first accumulation capacitor and the branch connection point where the oscillation line is electrically connected to the accumulation line.

8. The high-voltage direct current cut-off device according to claim 1, further comprising a charging circuit connecting, in a controlled manner, the oscillation circuit to ground to cause the rapid charging of one or more capacitors of the oscillation circuit.

9. The high-voltage direct current cut-off device according to claim 8, wherein the charging circuit includes a charging control switch.

10. The high-voltage direct current cut-off device according to claim 9, wherein the charging circuit includes a charging capacitor of which one plate is electrically connected to the oscillating circuit and of which the other plate is connected selectively, by the charging control switch, to ground.

11. The high-voltage direct current cut-off device according to claim 8, wherein the charging circuit includes an electrical charging resistance.

12. The high-voltage direct current cut-off device according to claim 1, wherein a resistance is disposed in parallel with the current limiter and is associated with one or more cut-off or commutation members allowing the circulation of the main conduction current either through the current limiter or through the resistance.

13. The high-voltage direct current cut-off device according to claim 1, wherein the current limiter includes a superconducting resistor.

14. The high-voltage direct current cut-off device according to claim 1, wherein the oscillation line comprises a coil connected in series with the oscillation control switch.

15. The high-voltage direct current cut-off device according to claim 1, further comprising an electronic control circuit capable of controlling the main cut-off apparatus and the oscillation control switch to their open state or to their closed state.

16. The high-voltage direct current cut-off device according to claim 15, wherein the electronic control circuit is configured to detect the intensity that exceeds a limit value in the first operating mode and configured to generate an opening signal of the main cut-off apparatus 100 milliseconds at the latest after detecting the intensity that exceeds the limit value.

17. The high-voltage direct current cut-off device according to claim 15, wherein the electronic control circuit, in a second operating mode, is configured to generate an opening signal of the main cut-off apparatus and configured to generate a closing signal of the oscillation control switch after the generation of the opening signal of the main cut-off apparatus.

18. The high-voltage direct current cut-off device according to claim 1, wherein a surge arrestor is connected electrically in parallel with at least one accumulation capacitor.

19. The high-voltage direct current cut-off device according to claim 1, wherein the high-voltage direct current cut-off device is dimensioned for the application of a potential difference at least equal to 10 kV and of a nominal current at least equal to 500 A between the first terminal and the second terminal.

20. The high-voltage direct current cut-off device according to claim 1, wherein the oscillation circuit is dimensioned to create, in the oscillation circuit, an oscillating current having an oscillating current intensity, wherein the oscillating current intensity has an oscillation amplitude at least equal to the threshold intensity and at least equal to the limited intensity of the current limiter.

21. The high-voltage direct current cut-off device according to claim 1, wherein the resonance frequency of the oscillating circuit formed is less than or equal to 10 kHz and/or the derivative of the current in the oscillating circuit with respect to time is equal to 500 A/microsecond at most.

22. The high-voltage direct current cut-off device according to claim 1, wherein the resonance frequency of the oscillating circuit formed is greater than or equal to 500 Hz.

23. The high-voltage direct current cut-off device according to claim 1, wherein, $C131$ representing the equivalent electrical capacitance of the primary segment of the accumulation line, and $C132$ representing the equivalent electrical capacitance of the secondary segment of the accumulation line, the parameter $Alpha=C132/(C131+C132)$ is greater than or equal to 0.2.

24. The high-voltage direct current cut-off device according to claim 1, wherein, $C131$ representing the equivalent electrical capacitance of the primary segment of the accumulation line, and $C132$ representing the equivalent electrical capacitance of the secondary segment of the accumulation line, the parameter $Alpha=C132/(C131+C132)$ is less than or equal to 0.9.

25. The high-voltage direct current cut-off device according to claim 1, wherein, $C131$ representing the equivalent electrical capacitance of the primary segment of the accumulation line, and $C132$ representing the equivalent electrical capacitance of the secondary segment of the accumulation line, the parameter $Alpha=C132/(C131+C132)$ is comprised in the range extending from 0.4 to 0.9.

26. The high-voltage direct current cut-off device according to claim 1, further comprising a snubber circuit connected electrically in parallel with the first cut-off terminal and second cut-off terminal of the main cut-off apparatus.

* * * * *